3,564,080
VULCANIZABLE COMPOSITIONS COMPRISING A MAJOR PORTION OF EPR OR EPDM AND A MINOR PORTION OF AMORPHOUS POLYPROPYLENE

Giovanni Pedretti, Ferrara, Gino Panciroli, Bologna, and Augusto Portolani, Milan, Italy, assignors to Montecatini Edison S.p.A., Milan, Italy, a corporation of Italy
No Drawing. Continuation-in-part of application Ser. No. 438,373, Mar. 9, 1965. This application July 9, 1968, Ser. No. 743,329
Claims priority, application Italy, Mar. 10, 1964, 5,262/64; June 25, 1964, 13,972/64
Int. Cl. C08f *37/18*
U.S. Cl. 260—897                                                                11 Claims

ABSTRACT OF THE DISCLOSURE

Vulcanizable high molecular weight elastomer compositions comprising (1) a high molecular weight vulcanizable elastomer selected from (a) saturated copolymers of ethylene and propylene or butene-1, and (b) low-unsaturation terpolymers of ethylene, propylene and a non-conjugated polyene, (2) an extender comprising from about 1 to 90 parts of substantially amorphous polypropylene per 100 parts of said vulcanizable elastomer; and (3) a curing agent.

CROSS-REFERENCE TO RELATED APPLICATION

This application is a continuation-in-part of copending application Ser. No. 438,373, filed Mar. 9, 1965.

BACKGROUND OF THE INVENTION

(1) Field of the invention

This invention relates to new, vulcanizable compositions and, more particularly, to such compositions comprising mixtures of high molecular weight, saturated, linear, amorphous and vulcanizable copolymers of ethylene with higher alpha-olefins, or of high molecular weight, low-unsaturation, amorphous vulcanizable terpolymers of ethylene, a higher alpha-olefin and cyclic or acyclic polyene, with substantially amorphous polypropylene as defined hereinafter as an extender or diluent for the copolymer or terpolymer.

(2) Description of the prior art

Synthetic elastomeric copolymerizates of ethylene and a higher alpha-olefin, $CH_2=CHR$ in which R is a hydrocarbon radical, more particularly a lower alkyl radical, preferably propylene and/or butene-1, which are vulcanizable to valuable synthetic rubbers or elastomers were first disclosed by Natta et al., who obtained them by copolymerizing ethylene and the higher alpha-olefin under special conditions and by means of halogen-containing catalyst systems prepared by mixing hydrocarbon-soluble vanadium compounds with organometallic compounds, more particularly alkyl aluminum compounds. These copolymers are characterized by being amorphous, free of unsaturation and substituent groups, and, as normally obtained, in the absence of molecular weight regulating agents, by having a high molecular weight indicated by, or reflected in, a high Mooney viscosity.

While these copolymers yield vulcanizates having excellent mechanical characteristics, some difficulty may be encountered in the processing thereof, for instance in extrusion and spinning operations, due to their high viscosity which results from the high molecular weight, which is typically above 20,000, usually above 50,000, and may be 500,000 or higher.

Those problems can be eliminated or minimized by reducing the viscosity of the amorphous copolymers, either by including suitable molecular weight regulating agents, such as hydrogen or diethyl zinc, in the copolymerization zone, or by after-treatments performed on the copolymers and involving the use of extenders or diluents which improve the workability of the copolymers without impairing the mechanical properties of the vulcanizates obtained therefrom. The inclusion of molecular weight regulating agents in the copolymerization zone, for controlling (reducing) the molecular weight of the amorphous copolymerizate as it is formed, has the disadvantage that the molecular weight of the final copolymerizate varies over a wide range, and hence the uniformity of the product is impaired.

After-treatments involving the use of extenders which act as diluents for the copolymers or the terpolymers offer the most desirable means of solving the problem, provided the extender is of relatively low cost and thus economically practicable, and provided, also, that the extender does not interfere with the curing agents or curing operation, and does not adversely affect the mechanical properties of the vulcanizates.

Diluents of the type conventionally used with plastic materials such as polyvinylchloride, for example, and which include such polar compounds as pohsphoric acid esters, phthalic acid esters, and benzoic acid esters, have not proved suitable for use as diluents or extenders for the amorphous, vulcanizable copolymers or terpolymers. The latter are non-polar in character and are not compatible with polar compounds.

Mineral oils, particularly highly refined paraffin oils, are good extenders for increasing the workability of the copolymers or terpolymers, but, due to the nature of such oils and the handling involved in the preparation thereof, those oils are relatively expensive and can increase the cost of the final vulcanizates to the point where the latter are not commercially competitive with other, less costly, synthetic rubbers. On the other hand, aromatic oils, which are less expensive because they are by-products of the petrochemical industry, are generally preferred for the terpolymers of ethylene with propylene and nonconjugated cyclic or acyclic dienes, but cannot be used as extenders for the amorphous, vulcanizable copolymers, at least in any substantial amounts, since the aromatic oils interfere with the agents used for curing or vulcanizing the copolymers.

SUMMARY OF THE INVENTION

The present invention provides new vulcanizable compositions comprising the high molecular weight amorphous linear copolymers or terpolymers of the above type, and an extender or diluent for the copolymers or terpolymers which has marked practical advantages over the extenders heretofore used or proposed for use.

More particularly, the invention provides new vulcanizable compositions comprising high molecular weight, amorphous, linear vulcanizable copolymers of ethylene and propylene or butene-1, or amorphous, linear, low-unsaturation vulcanizable terpolymers of ethylene, propylene or butene-1, and a cyclic or acyclic polyene, extended with a minor amount (about 1–90 parts per 100 parts of the copolymer or terpolymer) of a substantially amorphous polypropylene as defined herein, which compositions are characterized by easy workability and are convertible, by vulcanization, to synthetic rubbers or elastomers having excellent mechanical properties.

DESCRIPTION OF THE PREFERRED EMBODIMENTS

By the term "substantially amorphous polypropylene" as used herein, we mean to include polypropylene consisting essentially of atactic, linear macromolecules. This polymer is completely or substantially soluble in boiling n-heptane. This definition includes the by-product of the commercial production of isotactic polypropylene by polymerizing propylene in an inert liquid polymerization diluent or medium and in contact with a catalyst capable of orienting the polymerization of propylene preferentially to the production of isotactic macromolecules. Such polypropylne remaining in solution in the inert polymerization diluent may comprise a small amount of isotactic polypropylene insoluble in boiling n-heptane and have an isotacticity index range of from 2% to 10%.

The term "substantially amorphous polypropylene" as used herein also is meant to include polypropylene substantially made up of atactic, linear, regularly head-to-tail macromolecules which can be separated from a crude, total polypropylene consisting of sterically differentiated macromolecules including isotactic macromolecules, by extracting the crude total polypropylene with a suitable solvent, for example, ethyl ether at its boiling point.

In general, the "substantially amorphous polypropylene" used in the practice of this invention has the following characteristics:

| | |
|---|---|
| Intrinsic viscosity (in Tetralin at 135° C.) | 0.2–0.5 |
| Molecular weight | 14,000–48,000 |
| X-ray crystallinity (percent) | 10–17 |
| Specific gravity (kg./l.) | 0.870 |
| Ash content | 0.2–0.46 |
| Softening point (° C.) | 154–162 |
| Isotacticity index (percent) | 2–10 |
| Volatile matter (percent) | 2–7 |

The advantages of using the substantially amorphous polypropylene as the extender or diluent for the high molecular weight, vulcanizable copolymers or terpolymers include the fact that, due to its structure, the polypropylene is more compatible with the copolymers or terpolymers than the extenders or diluents used heretofore, including paraffin oils; the fact that the copolymers or terpolymers can be extended with larger amounts of the polypropylene than of the previously used extenders, for instance, a paraffinic oil or a mixture of such oils; the fact that the polypropylene can be a waste or by-product as mentioned hereinabove and thus a very economical extender or diluent for the compolymers or terpolymers even when used in relatively large amounts; and the surprising and unexpected fact that the values for the various physical parameters of the vulcanizates obtained from the polypropylene-extended copolymers and terpolymers are higher than the values for the same parameters of the vulcanizates obtained from the copolymers and terpolymers extended with other diluents including corresponding amounts of paraffin oils, indicating that the use of the polypropylene as extender or diluent has a favorable influence or various mechanical characteristics of the vulcanizates.

The polypropylene-extended vulcanizable copolymers of ethylene and the higher alpha-olefin, preferably propylene or butene-1, can be vulcanized with peroxide agents and free radical acceptors. The prolypropylene-extended vulcanizable low-unsaturation terpolymers of ethylene, a higher alpha-olefin (preferably propylene or butene-1) and a cyclic or acyclic polyene can be vulcanized with the usual sulfur formulations or with peroxide agents and free radical acceptors in the same manner as the copolymers.

The vulcanizates obtained from the polypropylene-extended high molecular weight copolymers and terpolymers have excellent resistance to heat, oxidation and ageing. These characteristics are only slightly poorer than those possessed by the vulcanizates obtained from the high molecular weight copolymers and terpolymers per se, in the absense of an extender or diluent.

The new vulcanizable compositions of the invention comprise the high molecular weight copolymers and terpolymers, the substantially amorphous polypropylene, curing agents, and, usually, a reinforcing filler. Antioxidants may also be included in the compositions which can be readily processed, for example extruded or spun, as a result of the use of the polypropylene as extender.

The amount of substantially amorphous polypropylene present in the composition as extender or diluent is from about 1 to 90 parts by weight, preferably from about 10 to 70 parts by weight, per 100 parts of the copolymer or terpolymer, when peroxide agents are used for the vulcanization, and preferably from 10 to 50 parts by weight per 100 parts of the terpolymer when the terpolymerizate is vulcanized using sulfur+accelerator formulations.

The foregoing different preferred ranges which depend upon the curing system used in the formulations are due to the fact that the substantially amorphous polypropylene undergoes some crosslinking with peroxides, thus taking part in the crosslinked structure formation, whereas it is completely inert toward the sulfur+accelerators system, and in the presence of this vulcanizing system is merely an inert extender.

When the composition is based on a high molecular weight, vulcanizable copolymer of ethylene and, e.g., propylene or butene-1, the organic peroxide is used in an amount between 0.1 and 10 parts by weight, per 100 parts of the copolymer, and the free radical acceptor is used in an amount which is less than half the amount of the peroxide. Suitable free radical acceptors include sulfur, quinone compounds, and furfural and its derivatives. The use of peroxy compounds and free radical acceptors in the vulcanization of the linear, saturated, high molecular weight, amorphous copolymers of ethylene and a higher alpha-olefin such as propylene and butene-1 is known in the art.

The ethylene/propylene or ethylene/butene-1 copolymers used in practicing this invention are amorphous, contain from about 20% to 80%, preferably from about 30% to 70%, by mols of ethylene, and have a Mooney viscosity ML (1+4) at 100° C. in the range of from about 30 to 130, preferably from about 60 to 90. Such copolymers can be obtained by copolymerizing the monomers in an inert liquid diluent in contact with halogen-containing catalyst systems prepared from hydrocarbon-soluble vanadium compounds and organo-metallic compounds, while maintaining, in the gas phase, an ethylene/propylene molar ratio of at least 1:1 or an ethylene/butene-1 molar ratio of at least 1:4. Suitable catalytic systems can be prepared from $VCl_4$, $VOCl_3$ or $VAc_3$ (Ac=acetylacetonate) and aluminum trialkyls or aluminum alkyl halides. Copolymerization temperatures between −100° C. and +100° C. can be used.

When the composition is based on the amorphous, high molecular weight, linear, low-unsaturation terpolymers of ethylene, a higher alpha-olefin, $CH_2$=CHR, in which R is a lower alkyl radical (preferably propylene) and a polyene, the terpolymer used contains from about 20 to 80% by mols of ethylene and from 0.1 to 18% by mols of a non-conjugated polyene which may be, for example, cyclooctadiene-1,5; dicyclopentadiene; cyclododecatriene-1,5,9; cyclododecadiene-1,7; cycloheptadiene-1,4; cyclohexadiene-1,4; norbornadiene; methylen-norbornene; dimethyl-tetrahydroindene; 6-methyl-heptadiene-1,5, hexadiene-1,4, 6-methyl-4,7,8,9-tetrahydroindene, ethylidene-norbornene, etc., the balance (to 100%) being units from the higher alpha-olefin.

Said terpolymers also have a high molecular weight above about 20,000, generally in the range of about 60,000 to 500,000, and can be obtained by the same methods used to produce the ethylene/propylene or ethylene/butene-1 copolymers.

The terpolymers are sulfur-vulcanizable and can be vulcanized with formulations comprising sulfur in an amount from about 0.75 to 2.5 parts, preferably about 2 parts, by weight per 100 parts of the terpolymers. Accelerators included in the formulations are used in lower amounts, preferably from 0.5 to 2.5 parts per 100 parts of terpolymer. Examples of such accelerators include tetramethylthiuramdisulfide, zinc diethyl dithiocarbamate, dipentamethylthiuramdisulfide, 2-mercaptobenzothiazole, dibenzothiazole disulfied and diphenylguanidine.

The compositions of the invention can be vulcanized at temperatures ranging from 110° C. to 220° C., preferably from 140° C. to 180° C.

The following examples are presented to illustrate the invention and are not intended to limit the scope thereof.

EXAMPLE 1

Mixes suitable for making molded articles were prepared by diluting an amorphous, linear, vulcanizable ethylene-propylene copolymer as described herein on a conventional roll mixer with different amounts of polypropylene having the above mentioned characteristics and by successively adding black fillers, antioxidants and curing agents.

The resulting mixes had the following compositions:

|  | Parts by weight |
|---|---|
| Ethylene-propylene copolymer (55% by mols of ethylene), ML (1+4) 100° C.=80 | [1] 100 |
| Polypropylene [2] | |
| HAF carbon black | 50 |
| Polymerized 2,2,4-trimethyl-1,2-dihydroquinoline | 0.5 |
| Zince oxide | 5 |
| Sulfur | 0.45 |
| Alpha - alpha' - bis(t.butyl - peroxy)diisopropyl benzene | 2.5 |

[1] Total for both polymers, apportioned as set forth in Table 1.
[2] Polypropylene characteristics: X-ray crystallinity, 10%; density, 0.885; viscosity, 0.4; ash content, 0.37%; Isotacticity, 9.7%; vulcanization in a press, 40 minutes at 165° C.

Table 1 gives the mechanical characteristics of the vulcanizates obtained with mixes containing the ethylene-propylene copolymer and polypropylene, depending on the ratio between the components:

TABLE 1

| Mechanical characteristics | Units | Ethylene-propylene copolymer/polypropylene ratio. | | | | |
|---|---|---|---|---|---|---|
| | | (a) 100/0 | (b) 90/10 | (c) 70/30 | (d) 50/50 | (e) 30/70 |
| Tensile strength | Kg./cm.$^2$ | 175 | 173 | 153 | 124 | 100 |
| Elongation at break | Percent | 270 | 440 | 400 | 400 | 400 |
| Elastic modulus at 300% | Kg./cm.$^2$ | | 96 | 90 | 88 | 83 |
| Elastic modulus at 100% | Kg./cm.$^2$ | 32 | 18 | 18 | 18 | 18 |
| Tearing strength | Kg./cm.$^2$ | 29 | 41 | 42 | 45 | 54 |
| Shore A Hardness | | 69 | 64 | 64 | 68 | 73 |
| Residual set at 200% | Percent | 3.5 | 5.5 | 8 | 13 | 24 |
| Residual set at 100% | do | 1.5 | 5 | 5 | 12.5 | 12 |

EXAMPLE 2

Mixes suitable for making extruded articles were prepared by diluting an ethylene-propylene copolymer on a roll mixer with various amounts of polypropylene as defined herein and successively adding black fillers, antioxidants and curing agents.

The compositions of the resulting mix were the following:

|  | Parts by weight |
|---|---|
| Ethylene-propylene copolymer (55% by mols of ethylene), ML (1+4) 100° C.=80 | [1] 100 |
| Polypropylene | |
| FEF carbon black | 70 |
| Polymerized 2,2,3-trimethyl-1,2-dihydroquinoline | 0.5 |
| Zinc oxide | 5 |
| Sulfur | 0.45 |
| Alpha - alpha' - bis(t.butyl-peroxy)diisopropylbenzene | 2.5 |

Vulcanization in a press, 40 minutes at 165° C.

[1] Total for both polymers, apportioned as set forth in Table 2.

Table 2 gives the mechanical characteristics of the vulcanizates obtained from mixes containing ethylene-propylene copolymer and polypropylene, at various ratios.

TABLE 2

| Mechanical characteristics | Units | Ethylene-propylene copolymer/polypropylene ratio | | | | | |
|---|---|---|---|---|---|---|---|
| | | (a) 100/0 | (b) 90/10 | (c) 70/30 | (d) 50/50 | (e) 30/70 | (f) 10/90 |
| Tensile strength | Kg./cm.$^2$ | 160 | 160 | 150 | 135 | 90 | 50 |
| Elongation at break | Percent | 220 | 250 | 275 | 325 | 370 | 420 |
| Elastic modulus at 100% | Kg./cm.$^2$ | 55 | 38 | 36 | 40 | 40 | 33 |
| Tear strength | Kg./cm.$^2$ | 39 | 44 | 52 | 55 | 52 | 42 |
| Shore A Hardness | | 76 | 76 | 76 | 76 | 76 | 78 |
| Residual set at 100% | Percent | 2 | 3 | 4 | 5 | 9 | 23 |
| Extrudability index at 100° C. (Garvey Die) | | 12 | 14 | 15 | 16 | 16 | 16 |

Under the same conditions, vulcanization runs were carried out with mixes based on 100% of the polypropylene as defined herein, for comparison purposes. The products obtained were insufficiently vulcanized and not homogeneous and showed blisters to such an extent that they were unsuitable even for tests for evaluating the mechanical characteristics.

EXAMPLE 3

Mixes suitable for making extruded articles and containing 50 parts of polypropylene as defined herein and 50 parts of ethylene-propylene copolymer with different Mooney viscosity were prepared on normal roll mixers, after the addition to the copolymer blend of black fillers, antioxidants and curing agents.

The compositions of the resulting mixes were the following:

|  | Parts by weight |
|---|---|
| Ethylene-propylene copolymer (55% by mols of ethylene), ML (1+4) 100° C.=[varied—see Table 3] | 50 |
| Polypropylene | 50 |
| FEF carbon black | 70 |
| Polymerized 2,2,4-trimethyl-1,2-dihydroquinoline | 0.5 |
| Zinc oxide | 5 |
| Sulfur | 0.45 |
| Alpha - alpha' - bis(t.butylperoxy)diisopropylbenzene | 2.5 |

Vulcanization in stream autoclave, 40 minutes under 6.5 atmosphere pressure.

The influence of the Mooney viscosity of the ethylene-propylene copolymer on the mechanical characteristics of the vulcanizates containing 50 parts of copolymer and 50 parts of the polypropylene is shown in Table 3. This example is presented only to illustrate the effect of the Mooney viscosity and is not illustrative of the present invention in that the ratio of polypropylene to copolymer is outside the scope thereof.

TABLE 3

| Mechanical characteristics | Units | Mooney plasticity of the ethylene-propylene copolymer | | |
|---|---|---|---|---|
| | | (a) ML (1+4) 100° C. =35 | (b) ML (1+4) 100° C. =80 | (c) ML (1+4) 100° C. =95 |
| Tensile strength | Kg./cm.² | 110 | 130 | 134 |
| Elongation at break | Percent | 290 | 290 | 275 |
| Elastic modulus at 100% | Kg./cm.² | 40 | 42 | 43 |
| Tear strength | Kg./cm.² | 42 | 52 | 49 |
| Shore A Hardness | | 74 | 75 | 73 |
| Residual set at 200% | Percent | 17 | 13.5 | 14 |
| Extrudability index at 100° C., Garvey die | | 16 | 16 | 15.5 |

EXAMPLE 4

Two types of mixes comprising ethylene-propylene copolymers diluted with varying amounts of polypropylene as defined herein and with paraffin oil, respectively, were prepared on conventional roll mixers.

The compositions of the mixes were as follows:

(I)

Parts by weight

Ethylene-propylene copolymer (55% by mols of ethylene), ML (1+4) 100° C.=80 ⎫
Polypropylene ⎬ ¹ 100
HAF carbon black _____ 50
Polymerized 2,2,4 - trimethyl - 1,2 - dihydroquinoline _____ 0.5
Zinc oxide _____ 5
Sulfur _____ 0.45
Alpha-alpha' - bis(t.butylperoxy)diisopropylbenzene _____ 2.5
Vulcanization in a press, 40 minutes at 165° C.

¹ Total for both polymers, apportioned as set forth in Table 4, part I.

(II)

Parts by weight

Ethylene-propylene copolymer (55% by mols of ethylene), ML (1+4) 100° C.=80 ⎫
Paraffin oil FL² ⎬ ¹ 100
HAF carbon black _____ 50
Sulfur _____ 0.45
Dicumylperoxide _____ 4
Vulcanization in a press, 40 minutes at 165° C.

¹ Total for both polymers, apportioned as set forth in Table 4, part II.
² FL 65 oil characteristics: $d_{15}°$, 0.86; viscosity at 98.9° C., 4 centistokes; V.G.C. (viscosity gravity constant), 0.80.

The influence of varying the amounts of the paraffin oils and of the polypropylene on the mechanical characteristics of the vulcanizates obtained from mixes based on an ethylene-propylene copolymer having a high Mooney viscosity and of the above mentioned ingredients used as diluents is shown in Table 4.

EXAMPLE 5

Mixes for making molded articles were prepared by diluting an ethylene/propylene/ethylidene-norbornene terpolymer, on a conventional roll mixer, with varying amounts of polypropylene as defined herein and then adding black fillers, antioxidants and curing agents.

The compositions of the mixes were the following:

Parts by weight

Ethylene/(32.5% by mols) propylene/(3.5% by mols) ethylidene-norbornene terpolymer, ML (1+4) 100° C.=73 _____ 70
Polypropylene _____ 30
HAF carbon black _____ 50
Zinc oxide _____ 5
Dicumylperoxide _____ 4
Vulcanization in a press, 30 minutes at 160° C.

In Table 5, the mechanical characteristics of the vulcanizates of mixes containing the terpolymer and polypropylene in a 70:30 ratio are reported.

TABLE 5

| Mechanical characteristics | Units | Ratio terpolymer: polypropylene ¹ |
|---|---|---|
| Tensile strength | Kg./cm.² | 150 |
| Elongation at break | Percent | 455 |
| Elastic modulus at 300% | Kg./cm.² | 102 |
| Elastic modulus at 200% | Kg./cm.² | 72 |
| Elastic modulus at 100% | Kg./cm.² | 35 |
| Residual set at 200% | Percent | 17 |
| Tear strength | Kg./cm.² | 50 |
| ISO hardness | | 70 |
| Heat build up measured by Goodrich flexometer, 20 lbs./30° C | ° C | (²) |
| Loss due to abrasion, Akron method | Cc.³ | 0.270 |
| ML (1+4) 100° C | | 54 |

¹ 70/30 parts by weight.
² Break of the specimen.
³ In 1,000 revolutions×10³.

EXAMPLE 6

Mixes comprising ethylene-propylene copolymers diluted with varying amounts of polypropylene were prepared on conventional roll mixers. The compositions of the mixes were the following:

Parts by weight

Ethylene-propylene copolymer (55% by mols of ethylene), ML (1+4) 100° C.=80 ⎫
Polypropylene ⎬ ¹ 100
HAF carbon black _____ 50
Polymerized 2,2,4-trimethyl-1,2 dihydroquinoline __ 0.5
Zinc oxide _____ 5
Sulfur _____ 0.45
Alpha,alpha'-bis(t.butylperoxy) diisopropylbenzene (40% in CaCO₃) _____ 6.25
Vulcanization, 40 minutes at 165° C.

¹ Total for both polymers, apportioned as set forth in Table 6.

Table 6 shows the various characteristics of the vulcanizates obtained from the above mentioned mixes, de-

TABLE 4

| Mechanical characteristes | Units | I Ethylene-propylene copolymer/paraffin oil ratio | | | | | II Ethylene-propylene copolymer/ polypropylene ratio | | | |
|---|---|---|---|---|---|---|---|---|---|---|
| | | (a) 75/25 | (b) 70/30 | (c) 65/35 | (d) 60/40 | (e) 55/45 | (f) 90/10 | (g) 30/70 | (h) 50/50 | (i) 30/70 |
| Tensile strength | Kg./cm.² | 150 | 140 | 120 | 110 | 90 | 174 | 154 | 124 | 101 |
| Elongation at break | Percent | 500 | 560 | 630 | 675 | 740 | 445 | 435 | 440 | 405 |
| Elastic modulus at 300% | Kg./cm.² | 70 | 60 | 45 | 36 | 25 | 95 | 90 | 88 | 85 |
| Residual set at 200% | Percent | 6 | 7.5 | 9 | 11 | 13.5 | 6 | 8 | 13 | 21 | pending on the ratio between the amounts of ethylene-propylene copolymer and the polypropylene.

TABLE 6

| Characteristics | Units | Ethylene-propylene copolymer/polypropylene ratio | | | | |
|---|---|---|---|---|---|---|
| | | (a) 100/0 | (b) 90/10 | (c) 70/30 | (d) 50/50 | (e) 30/70 |
| Loss due to abrasion, Akron Method | Cc. lost [1] | 0.227 | 0.209 | 0.229 | 0.156 | 0.113 |
| Heat build up measured at the Goodrich deflectometer 20 pound −30° C. | ° C. | 39 | 41 | 48 | 53 | 48 |
| Bonding to steel, with adhesives based on polyisocyanates. | Kg./cm.$^2$ | 30 | 47 | 47 | 32 | 0 |

[1] In 1,000 revolutions×10$^3$.

EXAMPLE 7

Mixes for making molded articles were prepared by diluting an ethylene/propylene/cyclooctadiene-1,5 terpolymer, on a conventional roll mixer, with varying amounts of polypropylene as defined herein, and then adding black fillers, antioxidants and curing agents.

The compositions of the resulting mixes were the following:

| | Parts by weight |
|---|---|
| Ethylene/(59% by mols) propylene/(3% by mols) cyclooctadiene-1,5 terpolymer, ML (1+4) 100° C.=84 | } [1] 100 |
| Polypropylene | |
| HAF carbon black | 50 |
| Zinc oxide | 5 |
| Phenylbetanaphthylamine | 1 |
| Tetramethylthiuramdisulfide | 1 |
| Mercaptobenzothiazole | 0.5 |
| Sulfur | 2 |

Vulcanization in a press, 60 minutes at 150° C.

[1] Total for both polymers, apportioned as set forth in Table 7.

In Table 7 there are reported the mechanical characteristics of the vulcanizates of mixes containing the terpolymer and polypropylene in various ratios.

TABLE 7

| Mechanical characteristics | Units | Ratio ethylene-propylene-cyclooctadiene-1,5 terpolymer/polypropylene (parts by weight) | | | | |
|---|---|---|---|---|---|---|
| | | (a) 100/0 | (b) 90/10 | (c) 70/30 | (d) 50/50 | (e) 30/70 |
| Tensile strength | Kg./cm.$^2$ | 185 | 183 | 162 | 98 | 61 |
| Elongation at break | Percent | 270 | 300 | 350 | 320 | 240 |
| Elastic modulus at 300% | Kg./cm.$^2$ | | 182 | 136 | 94 | |
| Elastic modulus at 200% | Kg./cm.$^2$ | 133 | 107 | 83 | 69 | 57 |
| Elastic modulus at 100% | Kg./cm.$^2$ | 47 | 41 | 36 | 40 | 40 |
| Residual set at 200% | Percent | 7 | 8.5 | 13.5 | 26 | (1) |
| Tear strength | Kg./cm.$^2$ | 38 | 45 | 50 | 49 | 42 |
| ISO hardness | | 74 | 73 | 74.5 | 78 | 81 |
| Heat build up measured by Goodrich fleximeter, 20 lbs/30° C. | ° C. | 35 | 40 | 51 | (1) | (1) |
| Loss due to abrasion (Akron method) | Cc.$^3$ | 0.158 | 0.207 | 0.236 | 0.214 | (3) |
| ML (1+4) 100° C. | | 110 | 91 | 64.5 | 45 | 31.5 |

[1] Break of the specimen.
[2] In 1,000 revolutions×10$^3$.
[3] Not determined.

EXAMPLE 8

Mixes for making extruded articles were prepared by diluting an ethylene/propylene/cyclooctadiene-1,5 terpolymer on a roll mixer, with various amounts of polypropylene as defined herein, and then adding black fillers, antioxidants and curing agents.

The compositions of the resulting mixes were the following:

| | Parts by weight |
|---|---|
| Ethylene/(59% by mols) propylene/(3% by mols) cyclooctadiene-1,5 terpolymer, ML (1+4) 100° C.=84 | } [1] 100 |
| Polypropylene | |
| FEF carbon black | 70 |
| Zinc oxide | 5 |
| Phenylbetanaphthylamine | 1 |
| Tetramethylthiuramdisulfide | 1 |
| Mercaptobenzothiazole | 0.5 |
| Sulfur | 2 |

Vulcanization in a press, 60 minutes at 150° C.

[1] Total for both polymers, apportioned as set forth in Table 8.

The mechanical characteristics of the vulcanizates obtained from these mixes are reported in Table 8.

TABLE 8

| Mechanical characteristics | Units | Ratio ethylene-propylene cyclooctadiene-1,5 terpolymer/polypropylene | | | | | |
|---|---|---|---|---|---|---|---|
| | | (a) 160/0 | (b) 90/10 | (c) 70/30 | (d) 50/50 | (e) 30/70 | (f) 10/90 |
| Tensile strength | Kg./cm.$^2$ | 198 | 172 | 147 | 96 | 51 | 29 A |
| Elongation at break | Percent | 250 | 230 | 240 | 230 | 100 | 60 |
| Elastic modulus at 200% | Kg./cm.$^2$ | 171 | 155 | 128 | 90 | | |
| Elastic modulus at 100% | Kg./cm.$^2$ | 71 | 70 | 65 | 53 | 50 | |
| Residual set at 100% | Percent | 4 | 7 | 13 | 11.5 | Break of the specimen | |
| Tear strength | Kg./cm.$^2$ | 44 | 47 | 50 | 44 | 44 | 27 |
| Hardness ISO | Kg./cm.$^2$ | 77 | 77 | 80 | 81 | 85 | 80 |
| Characteristics of the crude mix: | | | | | | | |
| ML (1+4) 100° C. | | 120 | 108 | 78 | 53 | 38 | 26 |
| Extrudability index at 100° C., Garvey | | 11 | 14 | 15 | 16 | 15 | 15 |

EXAMPLE 9

Mixes for making extruded articles containing 50 parts of amorphous polypropylene as defined herein, 50 parts of ethylene/propylene/cyclooctadiene-1,5 terpolymer with various Mooney viscosities, as well as a filler, antioxidant and curing agents, were prepared on conventional roll mixers.

The compositions of the mixes were the following:

| | Parts by weight |
|---|---|
| Ethylene/(59% by mols) propylene/(3% by mols) cyclooctadiene-1,5 terpolymer, ML (1+4) 100° C.=(varied—see Table 9) | 50 |
| Polypropylene | 50 |
| FEF carbon black | 70 |
| Zinc oxide | 5 |
| Phenylbetanaphthylamine | 1 |
| Tetramethylthiuramdisulfide | 1 |
| Mercaptobenzothiazole | 0.5 |
| Sulfur | 2 |

Vulcanization in a press, 60 minutes at 150° C.

The influence of the Mooney viscosity of the ethylene/propylene/cyclooctadiene terpolymer on the mechanical characteristics of the vulcanizates is shown in Table 9.

TABLE 9

| | | Mooney viscosity of the ethylene/propylene/cyclo-octadiene-1,5 terpolymer ML (1+4) 100° C. | | | | |
|---|---|---|---|---|---|---|
| Mechanical characteristics | Units | (a) 109 | (b) 84 | (c) 61 | (d) 36 | (e) 25.5 |
| Tensile strength | Kg./cm.$^2$ | 100 | 95 | 72 | 69 | 79 |
| Elongation at break | Percent | 145 | 180 | 130 | 120 | 170 |
| Elastic modulus at 100% | Kg./cm.$^2$ | 76 | 65 | 64 | 61 | 56 |
| Tear strength | Kg./cm.$^2$ | 41 | 47 | 42 | 39 | 39 |
| ISO Hardness | | 81 | 83 | 83 | 83 | 81.5 |

EXAMPLE 10

Mixes containing 50 parts of polypropylene as defined herein and 50 parts of terpolymers of different composition and, in addition, black fillers, anitoxidant and curing agents were prepared on conventional mixers of the art. Table 10 shows the compositions of the resulting mixes and the mechanical characteristics of the vulcanizates obtained from mixes diluted with the polypropylene, in comparison with the mechanical characteristics of the vulcanizates prepared with non-diluted mixes.

TABLE 10

| Terpolymers | Parts by weight | | | | | | | | |
|---|---|---|---|---|---|---|---|---|---|
| | (a) | (b) | (c) | (d) | (e) | (f) | (g) | (h) | (i) |
| Ethylene/)52% by mols) propylene/(6.8% by mols) dicyclopentadiene-1,5 ML (1+4) 100° C.=30 | 100 | 50 | | | | | | | |
| Ethylene/(37% by mols) propylene (4.1% by mols) dicyclopentadiene-1,5 ML (1+4) 100° C.=81 | | | 100 | 50 | | | | | |
| Ethylene/(41% by mols) propylene/-(3.1% by mols) methylene nor-bornene ML (1+4) 100° C.=91 | | | | | 100 | 50 | | | |
| Ethylene/(49.5% by mols) propylene/-(4.5% by mols) dicyclopentadiene ML (1+4) 100° C.=133 | | | | | | | 100 | 50 | |
| Polypropylene | | 50 | | 50 | | 50 | | 50 | |
| HAF carbon black | 50 | 50 | 50 | 50 | 50 | 50 | 50 | 50 | |
| Zinc oxide | 5 | 5 | 5 | 5 | 5 | 5 | 5 | 5 | |
| Phenylbetanaphthylamine | 1 | 1 | 1 | 1 | 1 | 1 | 1 | 1 | |
| Tetramethylthiuramdisulfide | 1 | 1 | 1 | 1 | 1 | 1 | 1 | 1 | |
| Mercaptobenzothiazole | 0.5 | 0.5 | 0.5 | 0.5 | 0.5 | 0.5 | 0.5 | 0.5 | |
| Sulfur | 2 | 2 | 2 | 2 | 2 | 2 | 2 | 2 | |
| Vulcanization in a press, 60 minutes at 150° C.: | | | | | | | | | |
| Tensile strength, kg./cm.$^2$ | 183 | 155 | 266 | 159 | 217 | 168 | 247 | 183 | |
| Elongation at break, percent | 300 | 375 | 420 | 410 | 300 | 330 | 305 | 375 | |
| Elastic modulus at 30% kg./cm. | 184 | 122 | 170 | 115 | 212 | 153 | 243 | 139 | |
| Residual set at 200%, percent | 6 | 13 | 8 | 17 | 6.5 | 13.5 | 5 | 12 | |
| Tear strength, kg./cm.$^2$ | 51 | 56 | 57 | 59 | 31 | 46 | 37 | 53 | |
| Hardness ISO | 78 | 78 | 76 | 75 | 78 | 75 | 74 | 73 | |

EXAMPLE 11

According to ASTM D573/53 specifications, ageing tests were carried out on specimens type C (ASTM D412/64T) prepared from vulcanizates obtained from mixes based on ethylene/propylene/cyclooctadiene-1,5 terpolymer diluted with varying amounts of polypropylene as defined herein. The mixes had the following compositions:

| | Parts by weight |
|---|---|
| Ethylene/(59% by mols) propylene/(3% by mols) cyclooctadiene-1,5 terpolymer, ML (1+4) 100° C.=84 | } [1] 100 |
| Amorphous polypropylene | |
| HAF carbon black | 50 |
| Zinc oxide | 5 |
| Phenylbetanaphthylamine | 1 |
| Thiuramethylthiuchromedisulfide | 1 |
| Marcaptobenzothiazole | 0.5 |
| Sulfur | 2 |

Vulcanization in a press, 60 minutes at 150° C.

[1] Total for both polymers, apportioned as set forth in Table 11.

The specimens were placed in a circulating air oven at a temperature of about 150° C. and the determinations of the mechanical characteristics were carried out successively at regular time intervals.

The mechanical characteristics of the mixes as a function of time and of the ratio between the ethylene/propylene/cyclooctadiene-1,5 terpolymer and polypropylene are reported in Table 11.

TABLE 11

| | | Ratio ethylene/propylene/cyclooctadiene-1,5 terpoly mer polypropylene | | | |
|---|---|---|---|---|---|
| Mechanical characteristics | Time in days | (a) 100/0 | (b) 90/10 | (c) 70/30 | (d) 50/50 |
| Tensile strength, kg./cm.$^2$ | 0 | 185 | 187 | 170 | 85 |
| | 1 | 188 | 175 | 142 | 90 |
| | 2 | 165 | 175 | 125 | 79 |
| | 3 | 149 | 151 | 124 | 77 |
| | 4 | 134 | 135 | 109 | 75 |
| | 5 | 121 | 129 | 101 | 64 |
| Elongation at break, percent | 0 | 260 | 310 | 340 | 270 |
| | 1 | 215 | 245 | 250 | 200 |
| | 2 | 170 | 200 | 200 | 160 |
| | 3 | 155 | 190 | 195 | 140 |
| | 4 | 160 | 180 | 170 | 150 |
| | 5 | 145 | 170 | 165 | 130 |
| ISO Hardness | 0 | 74 | 74 | 74.5 | 77 |
| | 1 | 77.5 | 76.5 | 77 | 82 |
| | 2 | 77 | 78 | 79 | 82 |
| | 3 | 78.5 | 76 | 79 | 82 |
| | 4 | 76 | 76.5 | 78.5 | 82 |
| | 5 | 78 | 77 | 78 | 83 |

EXAMPLE 12

Tests for evaluating the resistance to ozone were carried out according to ASTM D1149/55T specifications on vulcanized specimens prepared according to D518/57T Method A specifications, and made up of 100 parts of the ethylene/propylene copolymer of Example 1 and of the terpolymers of Examples 7 and 10 extended with 50 parts by weight of the polypropylene, for 100 hours at a temperature of 25° C., but at an ozone concentration of 300 parts per million.

The specimens did not show any appreciable ozone-cracking, similarly to the vulcanizates obtained from mixes based on unextended olefin copolymer or terpolymer; also the mechanical characteristics were substantially unchanged.

In Table 12, the mechanical characteristics of the vulcanizates of mixes containing the terpolymer and polypropylene in various ratios are reported.

TABLE 12

| Mechanical characteristics | Units | Ratio of ethylene/propylene/6-methyl-4,7,8,9-tetrahydroindene terpolymer polypropylene (parts by weight) | | | | |
|---|---|---|---|---|---|---|
| | | (a) 100/0 | (b) 90/10 | (c) 70/30 | (d) 50/50 | (e) 30/70 |
| Tensile strength | Kg./cm.² | 256 | 252 | 225 | 136 | 85 |
| Elongation at break | Percent | 295 | 300 | 355 | 325 | 240 |
| Elastic modulus at 300% | Kg./cm.² | | 250 | 188 | 130 | |
| Elastic modulus at 200% | Kg./cm.² | 160 | 129 | 100 | 83 | 69 |
| Elastic modulus at 100% | Kg./cm.² | 54 | 47 | 44.5 | 46 | 48 |
| Residual set at 200% | Percent | 7.5 | 9 | 14 | 28 | 41 |
| Tear strength | Kg./cm.² | 50 | 60 | 65 | 63 | 55 |
| ISO Hardness | | 80 | 79 | 80.5 | 84 | 88 |
| Heat build up measured by Goodrich fleximeter, 20 lbs./30° C. | °C | 40 | 46 | 58 | (1) | (1) |
| Loss due to abrasion, Akron method | (2) | 0.175 | 0.220 | 0.255 | 0.255 | (3) |
| ML (1+4) 100° C | | 120 | 99 | 71 | 49 | 35 |

[1] Break of the specimen.
[2] Cc. in 1,000 revolutions ×10³.
[3] Not determined.

EXAMPLE 13

Mixes for making molded articles were prepared by diluting an ethylene/propylene/6-methyl-4,7,8,9-tetrahydroindene terpolymer, on a conventional roll mixer, with varying amounts of polypropylene as defined herein and then adding black fillers, antioxidants and curing agents.

The compositions of the mixes were the following:

Parts by weight

Ethylene/(23% by mols) propylene/(4% by mols) 6-methyl-4,7,8,9-tetrahydroindene terpolymer, ML (1+4) 100° C.=107 ⎫
Polypropylene ⎬ [1] 100
HAF carbon black _____ 50
Zinc oxide _____ 5
Phenylbetanaphthylamine _____ 1
Tetramethylthiuramdisulphide _____ 1
Mercaptobenzothiazole _____ 0.5
Sulfur _____ 2
Vulcanization in a press, 60 minutes at 150° C.

[1] Total for both polymers, apportioned as set forth in Table 12.

EXAMPLE 14

Mixes for making molded articles were prepared by diluting an ethylene/propylene/ethylidene-norbornene terpolymer, on a conventional roll mixer, with varying amounts of polypropylene as defined herein, and then adding black fillers, antioxidants and curing agents.

The compositions of the mixes were the following:

Parts by weight

Ethylene/(32.5% by mols) propylene/3.5% by mols) ethylidene-norbornene terpolymer, ML (1+4) 100° C.=73 ⎫
Polypropylene ⎬ [1] 100
HAF carbon black _____ 50
Zinc oxide _____ 5
Phenylbetanaphthylamine _____ 1
Tetramethylthiuramdisulphide _____ 1
Mercaptobenzothiazole _____ 0.5
Sulfur _____ 2
Vulcanization in a press, 60 minutes at 150° C.

[1] Total for both polymers, apportioned as set forth in Table 13.

In Table 13, the mechanical characteristics of the vulcanizates of mixes containing the terpolymer and polypropylene in various ratios are reported.

TABLE 13

| Mechanical characteristics | Units | Ratio ethylene/propylene/ ethylidene-norbornene terpolymer:polypropylene (parts by weight) | | | | |
|---|---|---|---|---|---|---|
| | | (a) 100/0 | (b) 90/10 | (c) 70/30 | (d) 50/50 | (e) 30/70 |
| Tensile strength | Kg./cm.² | 209 | 212 | 190 | 110 | 71 |
| Elongation at break | Percent | 265 | 295 | 335 | 305 | 245 |
| Elastic modulus at 300% | Kg./cm.² | | | 143 | 105 | |
| Elastic modulus at 200% | Kg./cm.² | 151 | 123 | 95 | 76 | 65 |
| Elastic modulus at 100% | Kg./cm.² | 60 | 51 | 45 | 46 | 48 |
| Residual set at 200% | Percent | 8 | 10 | 15 | 31 | (1) |
| Tear strength | Kg./cm.² | 37 | 41 | 45 | 49 | 39 |
| ISO Hardness | | 78 | 78 | 79 | 82 | 85 |
| Heat build up measured by Goodrich fleximeter, 20 lbs./30° C. | °C | 44 | 49.5 | (2) | (2) | (2) |
| Loss due to abrasion, Akron method | Cc.³ | 0.195 | 0.251 | 0.275 | (1) | (1) |
| ML (1+4) 100° C | | 95 | 79 | 56 | 39 | 29 |

[1] Not determined.
[2] Break of the specimen.
[3] In 1,000 revolutions × 10³.

EXAMPLE 15

U.S. Pat. 3,240,727 to Scalari et al. discloses compositions of a major amount of amorphous polypropylene in admixture with a minor amount of a vulcanizable elastomeric copolymer for the preparation of expanded cellular materials. In Table 14 below, there are presented the compositions and results, in terms of elastomeric properties, of four experiments which were performed to demonstrate the criticality in the present invention of employing no more than 90 parts of amorphous polypropylene per 100 parts of vulcanizable copolymer or terpolymer. The markedly superior elastomeric characteristics of examples (b) and (d), containing the maximum amount of amorphous polypropylene which can be employed in accordance with the present invention, as compared to examples (a) and (c), respectively, wherein still more polypropylene is employed (a major amount as compared to the copolymer or terpolymer) demonstrates the criticality of this parameter in the present invention.

Another prior art patent, U.S. Pat. 3,210,301 to White, discloses the use of a minor amount of amorphous polypropylene as a processing aid in the recovery of reclaimed (already vulcanized) rubber. The experiments summarized in Table 15 demonstrate the remoteness of the disclosure of the White patent from the present invention. Thus, any attempt to apply the present invention to reclaimed rubber as opposed to unvulcanized elastomeric copolymers and terpolymers, even in example (c) of Table 15 wherein the reclaimed rubber was admixed with an equal amount of unvulcanized terpolymer, resulted in a product with very poor elastomeric properties. By comparison, much superior elastomeric properties were exhibited in experiment (d) of Table 15 wherein no amorphous polypropylene was employed. The vulcanization agents employed are those generally used for diene rubbers and mixtures of diene rubbers with reclaimed rubber.

TABLE 14

| | (a) | (b) | (c) | (d) |
|---|---|---|---|---|
| Amorphous polypropylene | 100 | 90 | 100 | 90 |
| Ethylene-propylene copolymer, 55% by mols of ethylene—ML=80 | 80 | 100 | | |
| HAF Carbon black | 50 | 50 | 50 | 50 |
| Zinc oxide | 5 | 5 | 5 | 5 |
| Polymerized 2,2,4-trimethyl-1,2-dihydroquinoline | 0.5 | 0.5 | | |
| Sulfur | 0.45 | 0.45 | 2 | 2 |
| Peroximon | 2.5 | 2.5 | | |
| Ethylene/propylene (59% by mols)/cyclooctadiene -1,5 (3% by mols) terpolymer ML=84 | | | 80 | 100 |
| Phenylbetanaphthylamine | | | 1 | 1 |
| Tetramethylthiuramdisulphide | | | 1 | 1 |
| Mercaptobenzothiazole | | | 0.5 | 0.5 |

| | 40 minutes at 165° C. | | 60 minutes at 150° C. | |
|---|---|---|---|---|
| Vulcanization in a press: | | | | |
| Tensile strength, kg./cm.² | 91 | 117 | 64 | 116 |
| Elongation at break, percent | 80 | 210 | 20 | 215 |
| Elastic modulus at 300%, kg./cm.² | | | | |
| Elastic modulus at 200%, kg./cm.² | | 115 | | 113 |
| Elastic modulus at 100%, kg./cm.² | | 85 | | 73 |
| Residual set at 100%, percent | ¹R | 25 | ¹R | 28 |
| Shore A Hardness | 83 | 84 | 87 | 85 |

¹ R indicates that specimen ruptured.

TABLE 15

| | (a) | (b) | (c) | (d) |
|---|---|---|---|---|
| Amorphous polypropylene | 35 | 90 | 35 | |
| Reclaimed rubber, prepared according to White | 100 | 100 | 50 | 100 |
| Ethylene/propylene (59% by mols)/cyclooctadiene-1,5 (3% by mols) terpolymer | | | 50 | |
| HAF carbon black | 50 | 50 | 50 | 50 |
| Zinc oxide | 5 | 5 | 5 | 5 |
| Phenylbetanaphthylamine | 1 | 1 | 1 | 1 |
| Stearic acid | 0.5 | 0.5 | 0.5 | 0.5 |
| N-cyclohexyl-2-benzothiazylsulphenamide, Santocure | 1.25 | 1.25 | 1.25 | 1.25 |
| Sulfur | 1.75 | 1.75 | 1.75 | 1.75 |

| | 60 minutes at 153° C. | | | |
|---|---|---|---|---|
| Vulcanization: | | | | |
| Tensile strength, kg./cm.² | 53 | 73 | 41 | 104-82 |
| Elongation at break, percent | 65 | 25 | 60 | 50-35 |
| Elastic modulus at 300%, kg./cm.² | | | | |
| Elastic modulus at 200%, kg./cm.² | | | | |
| Elastic modulus at 100%, kg./cm.² | | | | |
| Residual set at 100%, percent | ¹R | ¹R | ¹R | ¹R |
| Shore A Hardness | 87 | 90 | 83 | 92-91 |

¹ R indicates that specimen ruptured.

Variations can, of course, be made without departing from the spirit and scope of this invention.

Having thus described our invention what we desire to secure by Letters Patent and hereby claim is:

1. A vulcanizable composition comprising (1) a vulcanizable polymeric elastomer selected from the group consisting of (a) high molecular weight, linear, amorphous, saturated copolymers of ethylene and a higher alpha-olefin selected from the group consisting of propylene and butene-1, and (b) high molecular weight, linear, amorphous, low-unsaturation terpolymers of ethylene, propylene, and a non-conjugated polyene selected from the group consisting of cyclooctadiene-1,5; dicyclopentadiene; cyclododecatriene - 1,5,9; cyclododecadiene-1,7; cycloheptadiene-1,4; cyclohexadiene-1,4; norbornadiene; methyl-norbornene; dimethyl-tetrahydroindene; 6-methyl-heptadiene-1,5; hexadiene-1,4; 6-methyl - 4,7,8,9 - tetrahydroindene; and ethylidene-norbornene; (2) substantially amorphous polypropylene having a molecular weight in the range of about 14,000–48,000 as an extender for said vulcanizable polymeric material in an amount of from 1 to 90 parts by weight per 100 parts by weight of the vulcanizable polymeric elastomer; and (3) a curing agent selected from the group consisting of sulfur plus accelerators and an organic peroxide, said curing agent comprising both sulfur and an organic peroxide when said elastomer is copolymer (a).

2. The vulcanizable composition of claim 1 wherein the substantially amorphous polypropylene is present in an amount of from 10 to 70 parts by weight per 100 parts by weight of the vulcanizable polymeric elastomer.

3. The vulcanizable composition of claim 1 wherein the vulcanizable polymeric elastomer is a copolymer of ethylene and propylene.

4. The vulcanizable composition of claim 1 wherein the vulcanizable polymeric elastomer is a terpolymer of ethylene, propylene and cyclooctadiene-1,5.

5. The vulcanizable composition of claim 1 wherein the vulcanizable polymeric elastomer is a terpolymer of ethylene, propylene and dicyclopentadiene.

6. A process for preparing vulcanizates from the composition of claim 1 which comprises heating said composition to a vulcanization temperature between 110° C. and 220° C.

7. The process of claim 6 wherein the vulcanization temperature is between 140° C. and 180° C.

8. The composition of claim 1, cured to a vulcanized elastomer.

9. A vulcanizable composition comprising (1) a vulcanizable polymeric material selected from the group consisting of high molecular weight, linear, amorphous, low-unsaturation terpolymers of ethylene, propylene, and a non-conjugated polyene selected from the group consisting of cyclooctadiene-1,5; dicyclopentadiene; cyclododecatriene - 1,5,9; cyclododecadiene-1,7; cycloheptadiene-1,4; cyclohexadiene-1,4; norbornadiene; methylnorbornene; dimethyl-tetrahydroindene; 6-methylheptadiene-1,5; hexadiene-1,4; 6-methyl - 4,7,8,9 - tetrahydroindene; and ethylidene-norbornene; (2) as an extender for said vulcanizable polymeric material, from 5 to 80 parts by weight per 100 parts by weight of the terpolymer of a substantially amorphous polypropylene having a molecular weight in the range of about 14,000–48,000; and (3) a curing agent consisting of sulfur and an accelerator selected from the group consisting of tetramethylthiuramdisulfide, zinc diethyl dithiocarbamate, dipentamethylthiuramdisulfide, 2 - mercaptobenzothiazole, dibenzothiazole disulfide and diphenylguanidine.

10. The vulcanizable composition of claim 1, which further includes a reinforcing filler.

11. The vulcanizable composition of claim 1, which further includes an antioxidant.

(References on following page)

References Cited

UNITED STATES PATENTS

| | | | |
|---|---|---|---|
| 3,278,480 | 10/1966 | Radcliff et al. | 260—41 |
| 3,256,366 | 6/1966 | Corbelli | 260—897 |
| 3,240,727 | 3/1966 | Scalari et al. | 260—2.5 |
| 3,210,301 | 10/1965 | White | 260—4 |
| 2,933,480 | 4/1960 | Gresham et al. | 260—80.5 |

FOREIGN PATENTS

| | | | |
|---|---|---|---|
| 1,345,254 | 10/1963 | France | 260—897 |

MURRAY TILLMAN, Primary Examiner

C. J. SECCURO, Assistant Examiner

U.S. Cl. X.R.

260—41, 45.8, 45.9

PO-1050
(5/69)

UNITED STATES PATENT OFFICE
CERTIFICATE OF CORRECTION

Patent No. 3,564,080            Dated February 16, 1971

Inventor(s) GIOVANNI PEDRETTI, GINO PANCIROLI and AUGUSTO PORTC

It is certified that error appears in the above-identified patent and that said Letters Patent are hereby corrected as shown below:

Column 2, Line 30:    "pohsphoric" should read -- phosphoric --

Column 3, Line 54:    "compolymers" should read -- copolymers -

Column 3, Line 64:    After "influence", "or" should read -- or

Column 6, Line 11:    "2,2,3-trimethyl-" should read -- 2,2,4-trimethyl- --.

Column 6, Line 60:    "atmosphere" should read -- atmospheres -

Column 11, Table 10, first column line 1, following heading "Terpolymers": ")52% by mols)" should read -- (52% by mols)

Column 12, Line 10:    "Marcaptobenzothiazole" should read -- Mercaptobenzothiazole --.

Column 14, Lines 39 and 40:    "propylene/3.5% by mols)" shoulc read -- propylene/(3.5% by mols)

Column 15, Lines 2 and 3 of Table 14, first column: "Ethylei propylene copolymer, 55% by mols of ethylene - ML=80" should read -- Ethylene-propylene copolymer, (55% by mols of ethylei ML=80) --.

Column 15, Lines 2 and 3 of Table 15, first column: "Reclair rubber, prepared according to white" should read -- Reclaimec rubber (prepared according to white) --.

PR

PO-1050
(5/69)

UNITED STATES PATENT OFFICE
CERTIFICATE OF CORRECTION

Patent No. 3,564,080                    Dated February 16, 1971

Inventor(s) GIOVANNI PEDRETTI, GINO PANCIROLI and AUGUSTO PORTO

It is certified that error appears in the above-identified patent and that said Letters Patent are hereby corrected as shown below:

Column 15, Line 12 of Table 15, first column: "amide, Santocure: should read -- amide (Santocure) --.

Signed and sealed this 21st day of March 1972.

(SEAL)
Attest:

EDWARD M. FLETCHER, JR.              ROBERT GOTTSCHALK
Attesting Officer                     Commissioner of Patents